Patented Oct. 25, 1949

2,486,216

UNITED STATES PATENT OFFICE 2,486,216

MICROBIOLOGICAL MEDIA

Lloyd H. Silvernail and Paul A. Wolf, Midland, Mich., assignors to The Dow Chemical Company, Midland, Mich., a corporation of Delaware No Drawing. Application June 4, 1948, Serial No. 31,219

3 Claims. (Cl. 195—100)

This invention relates to microbiological media and is particularly concerned with an improved nutrient medium composition and a hydrogel-forming concentrate employed in the preparation of such medium.

Media for the culturing of microorganisms are commonly prepared by dispersing from about 1.8 to 2.0 per cent by weight of agar-agar in water. Nutrient ingredients such as malt extract, yeast extract, beef extract, peptone, and small amounts of inorganic salts are included to promote the growth of the organisms. The preparation is accomplished by mixing the agar-agar in hot water or a hot aqueous solution of nutrients to obtain a syrupy dispersion. Such agar-agar compositions gel when cooled to 40° to 45° C. and may then be heated to from 80° to 90° C. without returning to the fluid state. Heating to above 90° C. causes liquefaction. Media of these characteristics have found wide use in bacteriological determinations and practices, and particularly in the preparation of culture plates, culture tubes and slants.

Although microbiological technics have been developed to utilize media of the physical properties characterizing agar-agar, the latter are not in all respects satisfactory. Dry agar-agar is generally produced in countries foreign to the United States, is expensive, and not always in dependable supply. Furthermore, aqueous dispersions of agar-agar may not be employed for many purposes because of their gelation and liquefaction temperatures, the difficulty with which they form gels in the presence of substantial concentrations of inorganic salts, and their tendency to be liquefied by certain common organisms. In present practice, these problems are in part overcome by the use of gelatin, silica gel, and starch media and the development of specialized and complex laboratory technics.

A further problem resides in the difficulty with which organisms are recovered from agar-agar media. In operations involving large scale commercial production of desirable fungi, yeasts, and bacteria, the organisms are frequently grown on agar-agar media in trays. The simplest method of harvesting such a crop would be to liquefy the media and recover the organisms by filtration, sedimentation, or otherwise. However, this is generally impractical because the liquefaction temperature of the media is so high as to kill the organisms and possibly even to modify the chemical nature of the residues by hydrolysis or otherwise.

Similarly, existing media compositions with their characteristic temperatures of gelation and liquefaction complicate such common laboratory operations as inoculation, plating, and the like. Thus, if the media are to be inoculated in liquid form, the operation requires manipulation of the tubes at temperatures between the gelation point of the media and temperatures lethal to the organism. This frequently is a temperature range of a few degrees only, and necessitates the utilization of controlled temperature baths and the utmost of speed and dexterity on the part of the technician. In plating operations, it is impossible to liquefy an agar-agar slant covered with a mature organism growth and plate the culture without heating the media to a temperature at which the organism frequently is destroyed. These and similar problems make desirable the provision of improved nutrient media compositions.

The present invention provides new and improved microbiological media including methyl cellulose as the hydrogel-forming constituent. It has been found that aqueous dispersions of mixtures of methyl cellulose ethers of the proper viscosity types are characterized by certain desirable properties not common to many other media compositions. Thus, these dispersions are liquids at the prevailing laboratory temperature of 25° C., and gels at temperatures of 36° to 38° C. and higher as commonly employed in the incubation of inoculated media. Also, the gelation phenomenon is reversible, whereby upon cooling the media are again liquefied. The new media are gelled readily in the presence of inorganic salts, are not liquefied by microorganisms, and appear to be non-toxic. They are compatible with the nutrient additaments commonly employed in agar-agar compositions, and are of a texture resistant to tearing during inoculation, or cracking thereafter.

Methyl cellulose, as employed in the preparation of the new media compositions, is a white, finely divided material soluble in cold water and insoluble in most organic solvents. It is odorless, tasteless, and its water solutions are colorless and stable to light, alkalies and dilute acids. The degree of methylation of the product is from 29 to 32 per cent. Methyl cellulose of this specification is an article of commerce, being offered in an assortment of viscosities ranging from 5 to 4000 viscosity type (absolute). The "absolute viscosity" rating represents the viscosity in centipoises of a 2 per cent by weight solution in distilled water at 20° C. (by Ubbelohde viscosimeter as described in Industrial Engineering Chemistry, Analytical Edition, 9, 851, 1937). These methyl cellulose products are all soluble in cold water to produce viscous syrupy solutions having the characteristic of gelling on heating. In general, the higher the viscosity type of the methyl cellulose, the lower the gelation point and the more viscous the solution of the ether in cold water.

In approaching the problem of improved media compositions, certain limiting factors are encountered in the utilization of methyl cellulose. Thus to be economically attractive, the methyl cellulose concentrations must be low in order to compete in cost with agar-agar. Furthermore, an unfortunate relationship exists between gelation temperature and flowability of aqueous dispersions of methyl cellulose whereby compositions having the property of gelling at a temperature not greatly above room temperature ordinarily are so viscous on cooling as not conveniently to be manipulated in tubing and plating operations.

The foregoing difficulties have been overcome by the present invention thru the discovery that aqueous solutions of from about 4 to about 6 per cent of mixtures of low and high viscosity methyl cellulose products, have both low gelation temperatures and good flow characteristics. The preferred media include (1) from about 0.3 to about 1.0 per cent by weight of methyl cellulose of from 100 to 500 centipoises absolute viscosity (high viscosity type), and (2) from about 3.5 to 5.0 per cent by weight of methyl cellulose of from 8 to 18 centipoises absolute viscosity (low viscosity type). The actual viscosity of media of this composition ranges from about 60 to 600 centipoises. Compositions within this viscosity range are operable in most microbiological operations although an actual viscosity of from 60 to 300 centipoises is preferred because of faster handling in tubing operations. The expression "actual viscosity" refers to the viscosity in centipoises of the completed media at 20° C.

A further feature of the invention includes the provision of a concentrate from which the new media compositions are prepared. A physical mixture of from 6 to 28.57 parts by weight of the high viscosity type methyl cellulose (100 to 500 centipoises absolute viscosity) in 100 parts by weight of low viscosity type methyl cellulose (8–18 centipoises absolute viscosity) has been found to disperse readily to the extent of 4 per cent to 6 per cent by weight in water to produce media of the desired properties.

To prepare the new media compositions the proper amounts and proportions of high and of low viscosity types methyl cellulose may be added to cold water and agitated until a clear dispersion is obtained. A preferred method consists of first stirring finely divided methyl cellulose into about one-half the required amount of water at boiling temperature, and allowing it to soak for from 20 to 30 minutes. The remaining water is then added either as cold water or ice, and the mixture cooled to room temperature or below and stirred until homogeneous. Methyl cellulose is not soluble in hot water, but its fibrous particles become wetted out so that the ultimate solution in cold water is more readily obtained. Solutions of maximum clarity result when the methyl cellulose is first treated with hot water and thereafter thoroughly agitated at from 5° to 10° C.

In the preparation of the media, the conventional nutrient additaments and salts are incorporated as may be convenient. Thus they may be added to the water prior to the dispersion of methyl cellulose, or dissolved in the aqueous composition at below the gelation temperature of the mixture. The finished nutrient product may be employed generally in biological and microbiological procedures.

The new compositions are advantageously substituted for conventional media in many instances, as for examples in a modified phenol coefficient determination. This determination involves the manipulation of large numbers of sterile culture tubes under conditions where the time and temperature factors are critical. In current practice, bacterial inoculums are exposed to the action of the toxicant material for a definite period of time and thereafter subcultured in a nutrient broth. The inoculated broth is incubated at 37° C. for 48 hours to obtain an "all-or-none end point," i. e. either there is growth and the broth in the tubes is cloudy, or the organisms are dead and the tubes are clear. Where growth occurs, it is impossible to determine whether it results from one or a million surviving organisms in the inoculum. The nutrient broth medium is employed in preference to solid agar-agar media because of the difficulty in maintaining the latter in liquid form and at a temperature below the lethal temperature of the organisms. The use of agar-agar would necessitate operating at a narrow temperature range of from about 42° to 45° C., which would preclude the inoculation of more than a very few tubes at a time.

These new methyl cellulose nutrient media are particularly well adapted to be substituted for broth in a modified phenol coefficient determination. In such procedure, the liquid dispersion of methyl cellulose is apportioned into test tubes at room temperature in the usual manner, and heat-sterilized. This causes the medium to gel. The tubes and contents are then cooled to room temperature whereupon the medium liquefies. The tubes may then be inoculated at the convenience of the technician without concern as to critical temperature control. Upon incubation at 37° C., the medium again gels. At the end of the incubation period, examination will show each living organism in the original inoculum to have given rise to a distinct colony of organisms whereby the degree of initial control is readily ascertained. A further advantage is that individual colonies of contaminating organisms can be readily identified. When nutrient broth is employed, such identification requires the preparation of stains and smears of the broth culture and painstaking microscopic examination.

Other unique uses for the new compositions include their application for tissue culture work. This is of particular importance in cancer research studies and allied fields in which the effect of compounds upon isolated tissue can best be studied "in vitro." The methyl cellulose media gel at a low enough temperature to hold the isolated tissue in place as it is incubated in a nutritive environment, but can be liquefied by cooling to permit the recovery of the implanted tissues without injury. Conventional media requiring high temperatures to accomplish liquefaction, do not permit the carrying out of such operations.

The following are representative of compositions illustrating the invention:

*Composition A*

| | Parts by weight |
|---|---|
| Methyl cellulose 447 centipoises absolute viscosity | 0.5 |
| Methyl cellulose 17 centipoises absolute viscosity | 4.0 |
| Sodium chloride | 0.85 |
| Nutrient components | 0.80 |
| Water | 93.85 |

This composition was prepared by stirring a finely divided physical mixture of 0.5 part by weight 447 centipoise methyl cellulose and 4.0 parts of 17 centipoise methyl cellulose into 50 parts of boiling water. The mixture was agitated for 30 minutes and thereafter cooled by the addition of 20 parts by weight of ice and external cooling of the mixing vessel. The salt, nutrient components, and cold water sufficient to give 100 parts by weight were then added, and stirring and cooling continued at 10° to 20° C. until a clear solution was formed. This composition was liquid at 25°–30° C., and a gel after heating to 37° C. for 24 hours. The actual viscosity of the liquid mixture at 20° C. was 242 centipoises.

Composition B

| | Parts by weight |
|---|---|
| Methyl cellulose 120 centipoises absolute viscosity | 0.5 |
| Methyl cellulose 8 centipoises absolute viscosity | 3.75 |
| Sodium chloride | 0.85 |
| Nutrient components | 0.80 |
| Water | 94.10 |

In the preparation of this mixture, the methyl cellulose was stirred into a solution of the salt and nutrient components in water at a temperature of 10°–15° C. The resultant nutrient medium composition was dispersed into test tubes, sterilized, and employed for the culturing of bacterial organisms. The medium was a liquid at 25°–30° C. and a gel at 37° C. It had an actual viscosity of 126 centipoises at 20° C.

Composition C

| | Parts by weight |
|---|---|
| Methyl cellulose 120 centipoises absolute viscosity | 0.5 |
| Methyl cellulose 15 centipoises absolute viscosity | 3.5 |
| Sodium chloride | 0.85 |
| Nutrient components | 0.80 |
| Water | 94.35 |

This composition was prepared as described under Composition A. It was a liquid at 25°–30° C. and a soft gel after heating at 37° C. for 24 hours. The actual viscosity of the solution was 64 centipoises at 20° C.

Composition D

| | Parts by weight |
|---|---|
| Methyl cellulose 447 centipoises absolute viscosity | 1.0 |
| Methyl cellulose 15 centipoises absolute viscosity | 3.0 |
| Sodium chloride | 0.85 |
| Water | 95.15 |

This composition was produced by dispersing the indicated amounts of methyl cellulose products and salt in the water at 10°–20° C. The resulting solution was a liquid at 25°–30° C., a firm gel at 37° C., and had an actual viscosity of 361 centipoises at 20° C.

Composition E

| | Parts by weight |
|---|---|
| Methyl cellulose 447 centipoises absolute viscosity | 0.30 |
| Methyl cellulose 15 centipoises absolute viscosity | 5.0 |
| Sodium chloride | 0.85 |
| Nutrient components | 0.80 |
| Water | 93.05 |

This composition was prepared in the usual manner from a concentrate consisting of a mechanical mixture of the finely divided methyl cellulose products. The resulting solution was a liquid at 25°–30° C., a firm gel at 37° C., and had an actual viscosity of 263 centipoises at 20° C.

Other nutrient media compositions and their physical properties are set forth in the following table.

| High Viscosity methyl cellulose | | Low Viscosity methyl cellulose | | Per Cent NaCl | Per Cent Nutrient Components | Per Cent Water | Actual viscosity at 20° C. | Gelling properties at 37° C. for 24 hrs. |
|---|---|---|---|---|---|---|---|---|
| Per Cent | Absolute viscosity in centipoises | Per Cent | Absolute viscosity in centipoises | | | | | |
| 0.3 | 447 | 4.0 | 15 | 0.85 | 0.80 | 94.05 | 166.5 | Moderately firm gel. |
| 0.5 | 447 | 3.5 | 15 | 0.85 | 0.80 | 94.35 | 183 | Do. |
| 1.0 | 120 | 4.0 | 15 | 0.85 | 0.80 | 93.35 | 338 | Firm gel. |
| 0.5 | 120 | 4.0 | 15 | 0.85 | 0.80 | 93.85 | 152 | Moderately firm gel. |
| 0.5 | 120 | 4.0 | 8 | 0.85 | 0.80 | 93.85 | 77 | Soft gel. |
| 0.5 | 120 | 3.5 | 15 | 0.85 | 0.80 | 94.35 | 111 | Do. |
| 1.0 | 447 | 4.0 | 17 | 0.85 | | 94.15 | about 600 | Firm gel. |
| 1.0 | 447 | 4.0 | 8 | 0.85 | | 94.15 | about 530 | Do. |

We claim:

1. A nutrient microbiological medium comprising as gelling constituents (1) from 0.3 to 1.0 per cent by weight of methyl cellulose of from 100 to 500 centipoises absolute viscosity and (2) from 3.5 to 5.0 per cent by weight of methyl cellulose of from 8 to 18 centipoises absolute viscosity.

2. A nutrient microbiological medium comprising as gelling constituents not to exceed 6 per cent by weight of a mixture of water soluble methyl cellulose ethers, the medium being a liquid at 25° C. and a gel at 36°–38° C., and having an actual viscosity not substantially in excess of 600 centipoises at 20° C.

3. A finely divided hydrogel-forming composition comprising an intimate mixture of from 6 to 28.57 parts by weight of methyl cellulose of from 100 to 500 centipoises absolute viscosity in mixture with 100 parts by weight of methyl cellulose of from 8 to 18 centipoises absolute viscosity, and adapted to be dispersed in water in the amount of from 4 to 6 per cent by weight to produce microbiological media which are liquids at 25° C., gels at 36°–38° C., and have actual viscosities not substantially in excess of 600 centipoises at 20° C.

LLOYD H. SILVERNAIL.
PAUL A. WOLF.

REFERENCES CITED

The following references are of record in the file of this patent:

UNITED STATES PATENTS

| Number | Name | Date |
|---|---|---|
| 2,358,549 | Wenck | Sept. 19, 1944 |

OTHER REFERENCES

Ind. and Eng. Chem., 1937, page 985, by Bock.